United States Patent
Riordan et al.

(10) Patent No.: US 6,866,463 B2
(45) Date of Patent: Mar. 15, 2005

(54) E-FRAME AND DOLLY SYSTEM FOR STOCKING PRODUCTION LINES

(75) Inventors: Anthony Riordan, Essex (GB); Cliff Graham, Essex (GB); Robert Liggins, London (GB); Michael Norbert Colberg, Bergheim (DE)

(73) Assignee: Ford Motor Company, Dearborn, MI (US)

( * ) Notice: Subject to any disclaimer, the term of this patent is extended or adjusted under 35 U.S.C. 154(b) by 33 days.

(21) Appl. No.: 10/065,224

(22) Filed: Sep. 26, 2002

(65) Prior Publication Data

US 2003/0099537 A1 May 29, 2003

Related U.S. Application Data

(60) Provisional application No. 60/333,956, filed on Nov. 28, 2001.

(51) Int. Cl.$^7$ .................................................. B60P 1/64
(52) U.S. Cl. ........................ 414/498; 280/79.3; 414/812
(58) Field of Search ............................ 280/79.11, 79.2, 280/79.3, 408; 414/498, 331.01, 812

(56) References Cited

U.S. PATENT DOCUMENTS

| | | | | |
|---|---|---|---|---|
| 2,650,731 A | * | 9/1953 | Adler | 414/498 |
| 3,740,066 A | * | 6/1973 | Gieringer et al. | 280/408 |
| 4,127,202 A | | 11/1978 | Jennings et al. | |
| 4,155,471 A | | 5/1979 | Yancy | |
| 4,515,518 A | * | 5/1985 | Gilbert et al. | 414/459 |
| 4,687,215 A | | 8/1987 | Brendgord et al. | |
| 5,072,960 A | * | 12/1991 | Sperko | 414/401 |
| 5,224,812 A | * | 7/1993 | Oslin et al. | 414/401 X |
| 5,320,475 A | * | 6/1994 | Pinder | 414/498 X |
| 5,445,396 A | | 8/1995 | Sebor | |
| 5,906,384 A | | 5/1999 | Nelson | |
| 6,098,761 A | | 8/2000 | Kooima et al. | |
| 6,257,152 B1 | | 7/2001 | Liu | |
| 6,607,199 B2 | * | 8/2003 | Gruber | 280/33.991 |

FOREIGN PATENT DOCUMENTS

| | | | | |
|---|---|---|---|---|
| FR | 2631948 | * | 12/1989 | 414/498 |
| FR | 2773545 | | 1/1998 | |

* cited by examiner

*Primary Examiner*—Thomas J. Brahan
(74) *Attorney, Agent, or Firm*—Raymond L. Coppiellie

(57) ABSTRACT

A component part container delivery rack used in manufacturing operations. An E-frame defining at least two compartments that are open on at least one side that extends between the front and back ends of the rack. The frame is supported on a plurality of wheels and is adapted to receive a dolly in the compartment. Each dolly is removably received in one of the compartments and locked in place when placed in the delivery rack. The locking element includes a pivoting lever that is rotated to lock and unlock the dolly within the compartment. The dolly is supported on roller guide elements that guide the dollies as they are moved into and out of the compartment. The dollies are raised above the floor so that the wheels of the dollies do not contact the floor as it is transported by the rack.

20 Claims, 5 Drawing Sheets

E-FRAME AND DOLLY SYSTEM FOR STOCKING PRODUCTION LINES

CROSS REFERENCE TO RELATED APPLICATIONS

This application claims the benefit of U.S. provisional application Ser. No. 60/333,956, filed Nov. 28, 2001.

BACKGROUND OF INVENTION

1. Field of the Invention

This invention relates to production line stocking equipment.

2. Background Art

Production lines generally, and in particular automotive assembly lines, are serviced by material handling trucks that deliver component parts to production stations. In many instances, a tow motor truck is used to deliver several bins or racks to an unloading area near a production line. At the production line, a lift truck, or hi-low, picks up the bins or racks from the unloading area and delivers them one at a time to the production station. The lift truck sorts the bins and racks that are dropped off by the tow motor as it takes the bins and racks to the proper production line station. Using a forklift truck to move bins and racks normally requires that loads be lifted off the ground and, therefore, may create safety concerns.

Tow motors usually take from one to four bins or racks of parts from the storage location to the production line in a train if the tow motor is servicing several lines or must make several stops on the same line. The operator normally pulls the tow motor to the first location and disengages the trailer hook of the last rack from the hook receptacle. Preferably, the tow motor works so that the end of the train is dropped off first and empty containers to be returned to a storage location are placed at the end of the train. This process continues until all of the parts have been delivered and a train of empty containers is in tow.

Planning is required to place the bins and racks in the proper order and changes in the route can disrupt even the most carefully planned drop off sequence. If, for instance, a three bin train is pulled by a tow motor and it becomes necessary to provide the first bin in the train to the production line before the other bin in a train, effort is wasted and it may become necessary to move heavy part-laden bins to reconnect them to the tow motor.

There is a need for a simple system for stocking production lines with parts that provides flexibility as to the order in which parts are supplied. There is also a need for a lightweight part container or dolly that can be moved by workers without requiring a lift truck to sort and deliver bins of production parts.

Another problem associated with delivering conventional bins or racks to a production line is that they normally have hooks and hook receptacles that may remain with the racks. The space required for the hooks adds to congestion at line side work stations.

The present invention is directed to providing a solution to the above problems and provides an efficient solution to many other material handling problems encountered in assembly line and other production operations.

The above problems and disadvantages are addressed by the present invention as summarized below.

SUMMARY OF INVENTION

According to one aspect of the present invention, a component part container delivery rack system for use in manufacturing operations is provided. The system includes a component part container with at least one dolly for supporting the component part container. The dolly is movably supported on a first set of wheels. A frame is supported on a second set of wheels and includes a front end, back end, and at least two compartments that are open on at least one side extending between the front and back ends. A locking element selectively engages one of the dollies to lock the dolly into one of the compartments during transport of the dolly by the frame. The dolly is configured to be removably received in one of the compartments.

According to another aspect of the invention, a production line part stocking trailer assembly is provided. The assembly includes a rack supported on a first set of wheels that has a towing adapter at one end for attachment to a tow motor truck or another rack. The rack has a side opening and supporting members on opposite edges of the side opening. A dolly having a second set of wheels is provided that is adapted to be inserted and removed through the side opening and selectively carried by the rack. The dolly is temporarily disposed on the supporting member when carried by the rack with the second set of wheels being spaced from the ground.

According to other aspects of the invention, the rack and dolly may include a locking mechanism for selectively locking the rack and dolly together when the dolly is carried by the rack. The locking mechanism may comprise a lock that is automatically engaged to lock the dolly into the rack but the locking mechanism does not completely span the side opening. The locking element may comprise a pivoting lever disposed adjacent one of the compartments that is pivoted between a locked position and an unlocked position. An automatic actuator engaged by the dolly may shift the locking element to the locked position when the dolly is inserted into the compartment. A manual, or foot pedal, actuator may be provided on the frame for shifting the locking element from the locked to the unlocked position.

According to other aspects of the invention, a plurality of guide elements may be provided on the frame for guiding movement of the dollies into and out of the compartments. The guide elements may lift the dolly as it is inserted into the compartment so that the plurality of wheels on the dolly are off the ground when the dolly is disposed in the compartment. The guide elements may be rollers secured to the frame. The guide elements may also be characterized as comprising a plurality of rollers disposed on each edge of the side opening. The rollers are engaged by cooperative portions of the dolly that ride upon the rollers as the dolly is inserted and removed through the side opening.

Still further aspects of the invention relate to the dollies that comprise a platform deck having a plurality of pockets. Each of the pockets may be configured to receive one of the plurality of wheels of another dolly stacked on top of the dolly. The platform deck may comprise an upper surface that is supported by a honeycomb body. The dolly may be formed of lightweight polymeric material having hard inserts that engage the guide elements.

The invention may also be characterized as a method of stocking a production line. A motorized truck having a towing adapter and a plurality of wheeled trailers are provided with a towing hook and a hook receiver, respectively, on one of a front or back end of the trailer. Each trailer has two sides extending between the front and back ends. The trailer is accessible from at least one of the two sides for loading a plurality of platforms having wheels on to the trailers for transporting a plurality of wheeled platforms. A first set of wheeled platforms bearing a plurality of parts are loaded onto the trailers from the side. The trailers transport the first set of wheeled platforms and parts carried thereby to the production line. The first set of wheeled platforms carrying the parts are unloaded one at a time from the side of the trailers. A second set of empty wheeled platforms may be loaded onto the side of the trailers one at a time to replace the first set of wheeled platforms carrying the parts.

According to other aspects of the method of the present invention, towing hooks and hook receivers are not unhooked as the first and second sets of wheel platforms are loaded and unloaded. The unloading steps may be performed by rolling the first and second sets of wheeled platforms onto and off of the trailers through an opening in the side of the trailers. According to the method, during the step of transporting the wheeled platforms, the wheels of the platforms may be held in a raised position above the surface of the floor. The method may also include the step of locking the wheeled platforms onto the trailers to prevent transverse movement of the wheeled platforms relative to the trailers after each of the loading steps. The wheeled platforms are unlocked prior to the unloading step to permit the wheeled platforms to be transversely moved relative to the trailers during the unloading step. The method may include lifting the wheeled platforms during the loading steps and lowering the wheeled platforms during the unloading step.

These and other objects and advantages of the invention will be better understood in view of the attached drawings and following detailed description of one or more modes of the invention described below.

DETAILED DESCRIPTION

Figure 1:
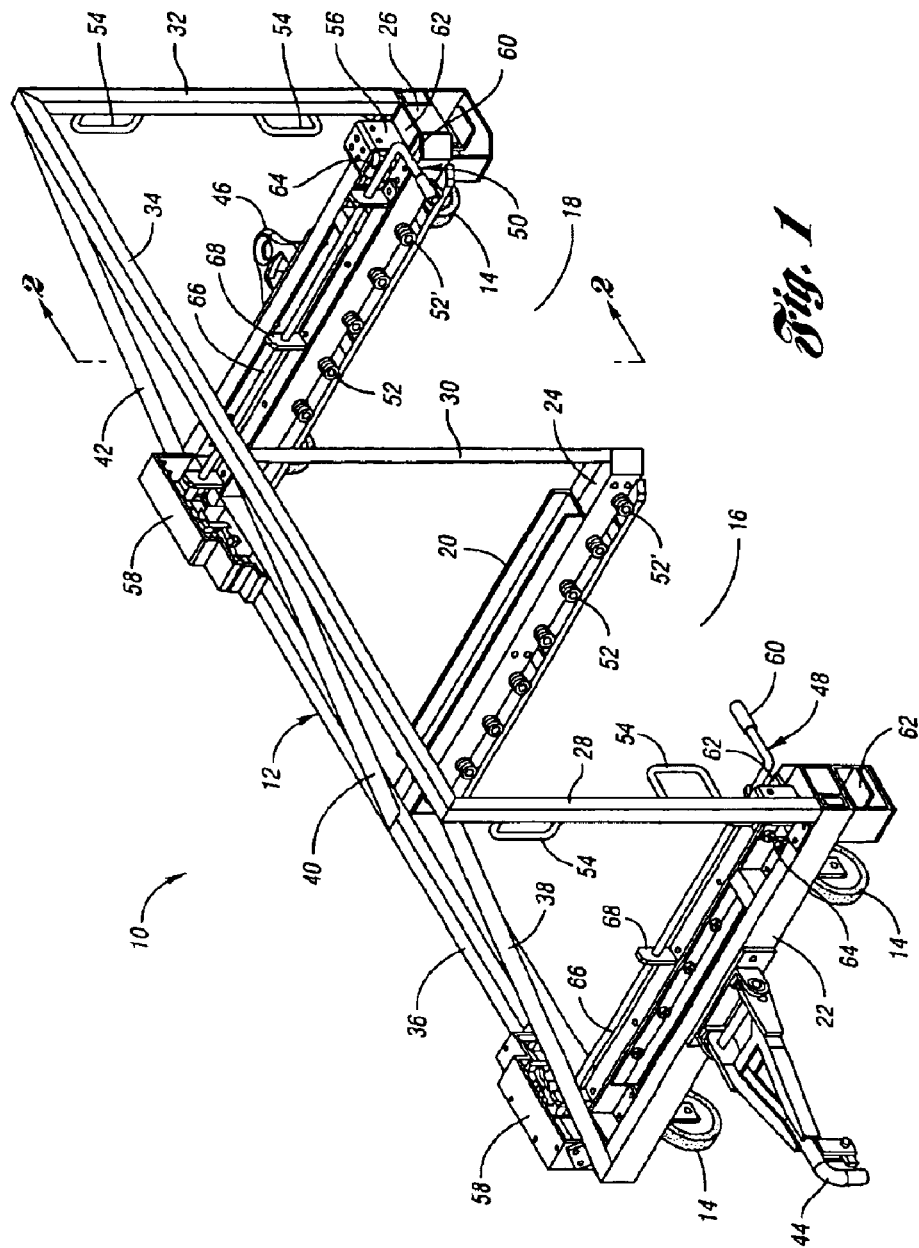
FIG. 1 is a front side perspective view of a delivery rack made in accordance the present invention.

Referring now to FIG. 1, a delivery rack is generally referred to by reference numeral 10. The delivery rack 10 includes a frame generally indicated by reference numeral 12 that is supported on pivotal wheels 14. The frame 12 defines first and second compartments 16 and 18. The frame 12 includes an E-shaped base 20. The E-shaped base includes a front transverse rail 22, a central transverse rail 24, and a back transverse rail 26. The transverse rails are connected on one end to front upright rail 28, central upright rail 30, and back upright rail 32, respectively. The upper ends of the upright rails 26, 28, and 30 are connected to a top rail 34. Side rail 36 is connected by front support rail 38, central support rail 40, and back support rail 42 to the top rail 34. The E-shaped base is formed by the side rail 36 and the transverse rails 22, 24, and 26. First and second compartments 16 and 18 are open at the ends of the transverse rails opposite the side rail 36.

Figure 8:
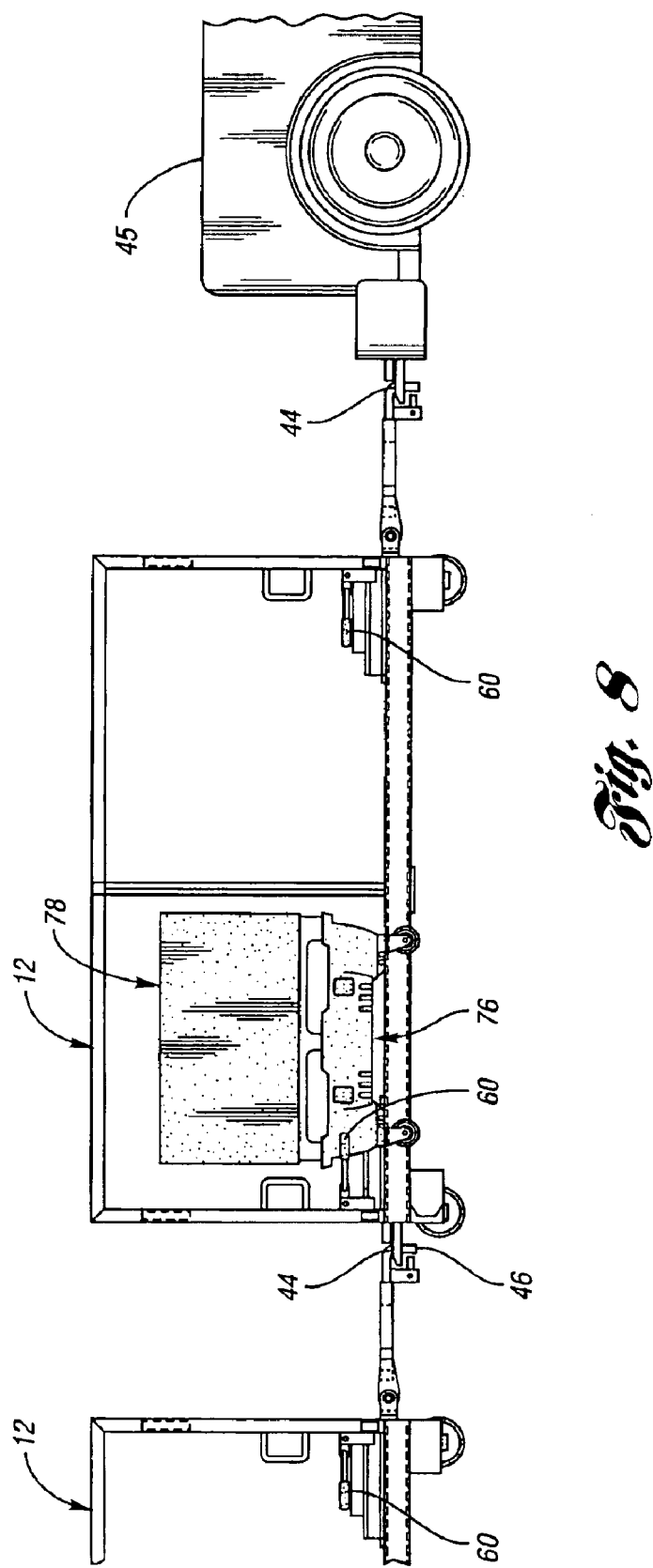
FIG. 8 is a side view of a component part container delivery rack system.

The rack 10 includes a hook 44 and hook receptacle 46. The hook 44 is adapted to be connected to a tow motor truck 45 or the hook receptacle 46 of another delivery rack 10 as shown in FIG. 8. The hook 44 is detachable from the hook receptacle 46 to permit arrangement of the delivery racks as a train.

First and second locking elements 48 and 50 are provided on the front transverse rail 22 and back transverse rail 26, respectively. The locking elements 48 and 50 are used to retain dollies 76 that will be described with reference to FIGS. 5–7 below within the first and second compartments 16 and 18. Roller guides 52 are provided on the transverse rails on the front and rear sides of the first and second compartments 16 and 18. The roller guides 52 may include a first roller guide 52' that is downwardly offset relative to the other roller guides 52 so that the dollies 76 may be lifted slightly as they are inserted into the compartment 16 or 18. The dollies 76 are lifted so that when the delivery rack 10 is moved with dollies 76 in a compartment 16, 18, the wheels of each dolly 76 will be spaced slightly from the floor. The dolly 76 is adapted to support one or more component part containers 78.

A plurality of handles 54 are provided on the rack 10 to facilitate maneuvering the rack by hand.

Figure 2:
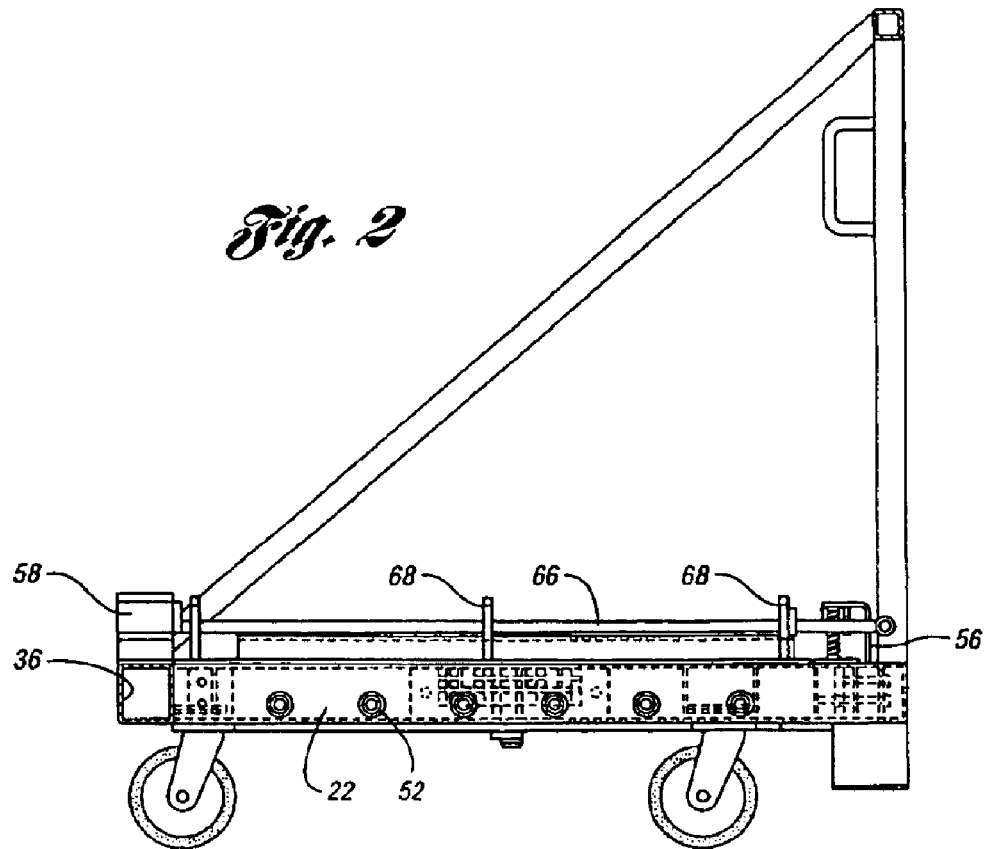
FIG. 2 is a cross-sectional view taken along line 2—2 in FIG. 1.
Figure 3:
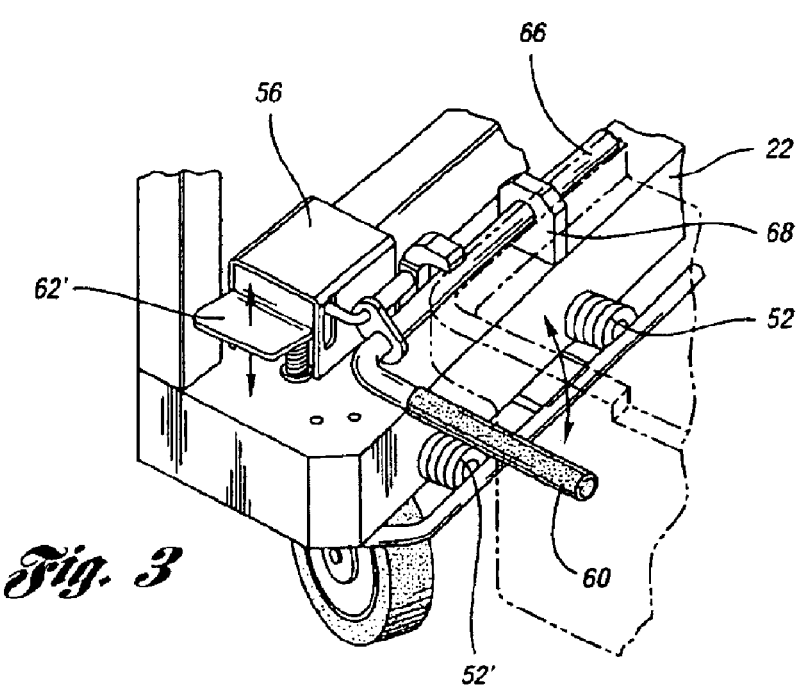
FIG. 3 is a fragmentary side perspective view of part of an alternative embodiment of a pivoting lever locking mechanism.

Referring now to FIGS. 1, 2, and 3, a manual actuator housing 56 is provided on each of the front and rear transverse rails adjacent the opening in the first and second compartment 16, 18. An automatic lock housing 58 is provided on the side rail 36 adjacent the front transverse rail 22 and back transverse rail 26. A pivot lever 60, pedal 62 and an associated spring return 64 are provided in conjunction with the manual actuator housing 56. In FIG. 1, pedal 62 is located below the front transverse rail 22, while in FIG. 3, the pedal 62' is mounted on top of the rail 22. Pivot lever 60 pivots from a vertical released position permitting ingress and egress of dolly 76 from the delivery rack 10 and a horizontal locked position wherein the dolly 76 is held within the first or second compartments 16, 18. The pedal 62 is used to release the pivot lever 60 when it is desirable to remove a dolly from the compartments 16, 18 or if necessary to insert a dolly in one of the compartments 16, 18. The pedal includes a spring return 64 that biases the pedal upwardly and locks the pivot lever 60 in place. The pivot lever 60 is part of an elongate bar 66 that is retained by guide blocks 68 at spaced points along the transverse rail 22, 26.

Figure 4:
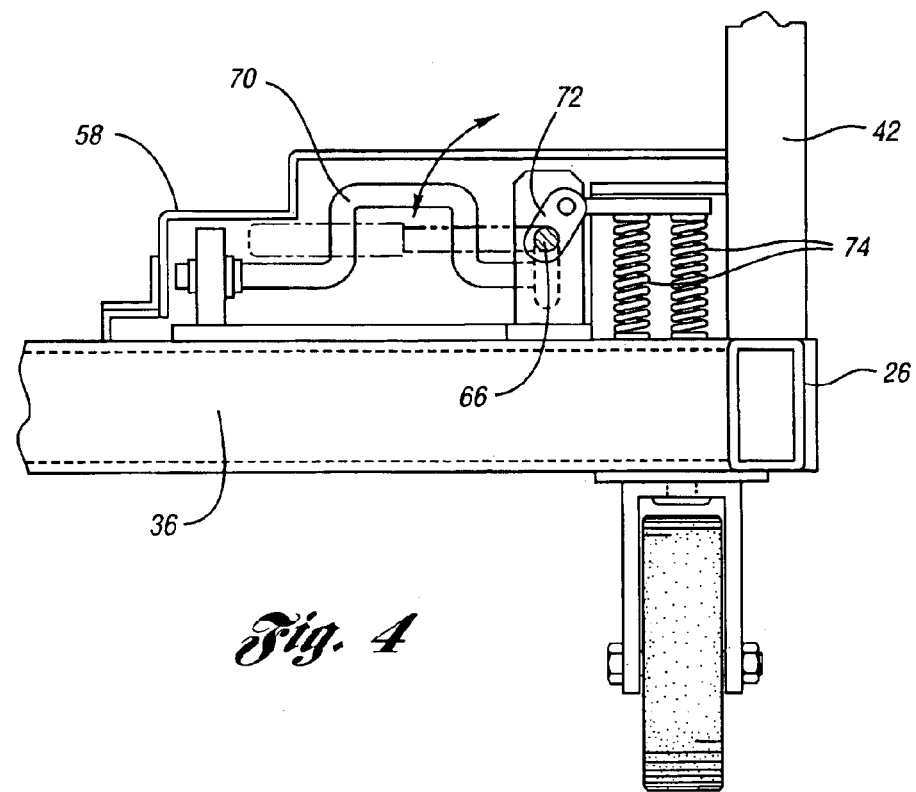
FIG. 4 is a side elevation view of part of the pivoting lever locking mechanism.

Referring now to FIGS. 1, 2, and 4, the automatic lock housing 58 houses an automatic actuator bar 70 that is connected by a link 72 to the elongate bar 66. The return springs 74 hold the automatic actuator bar 70 in a ready position when a dolly 76 is not contained within one of the compartments 16, 18. When a dolly 76 is placed in the compartment and pushed against the automatic actuator bar 70, the biasing force of the return spring 74 is counteracted and the pivot lever 60 is automatically pivoted to its horizontal or locking position.

Figure 5:
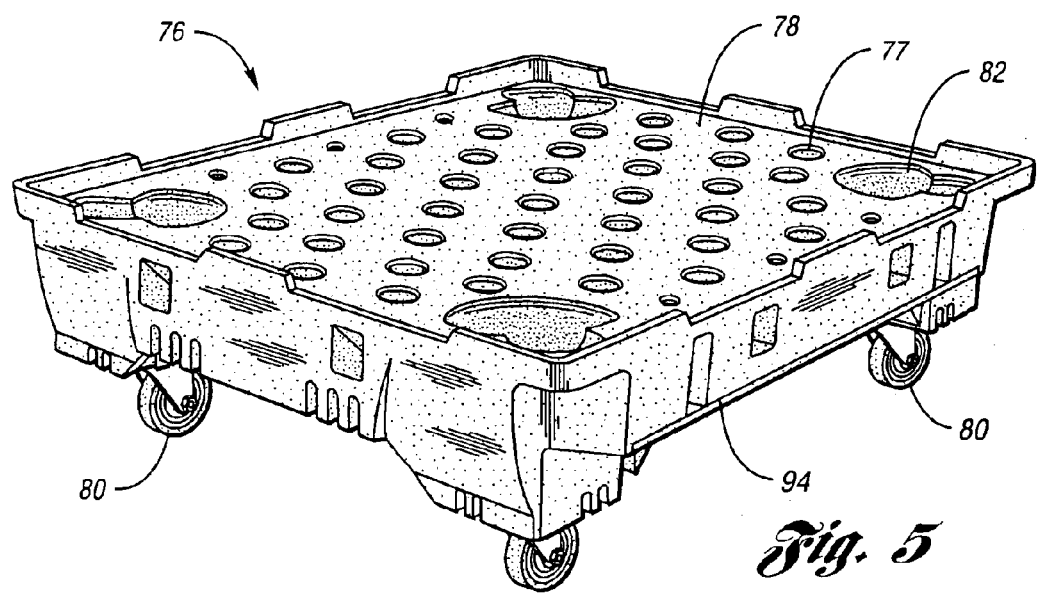
FIG. 5 is a perspective view of a wheeled dolly.
Figure 6:
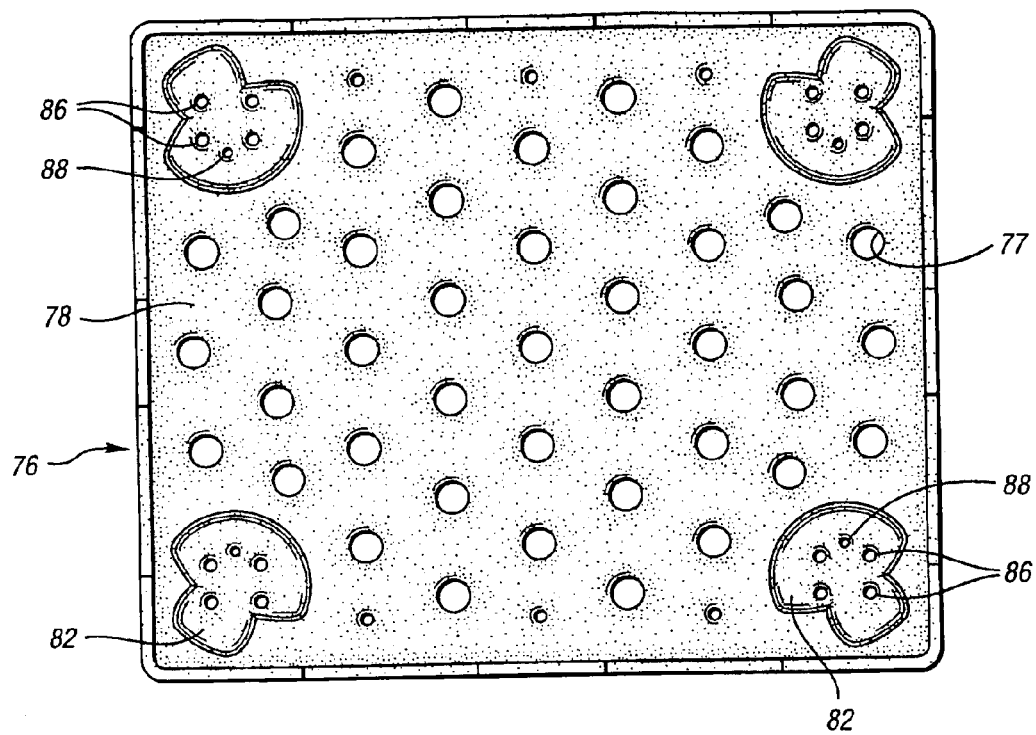
FIG. 6 is a top plan view of the wheeled dolly shown in FIG. 5.
Figure 7:
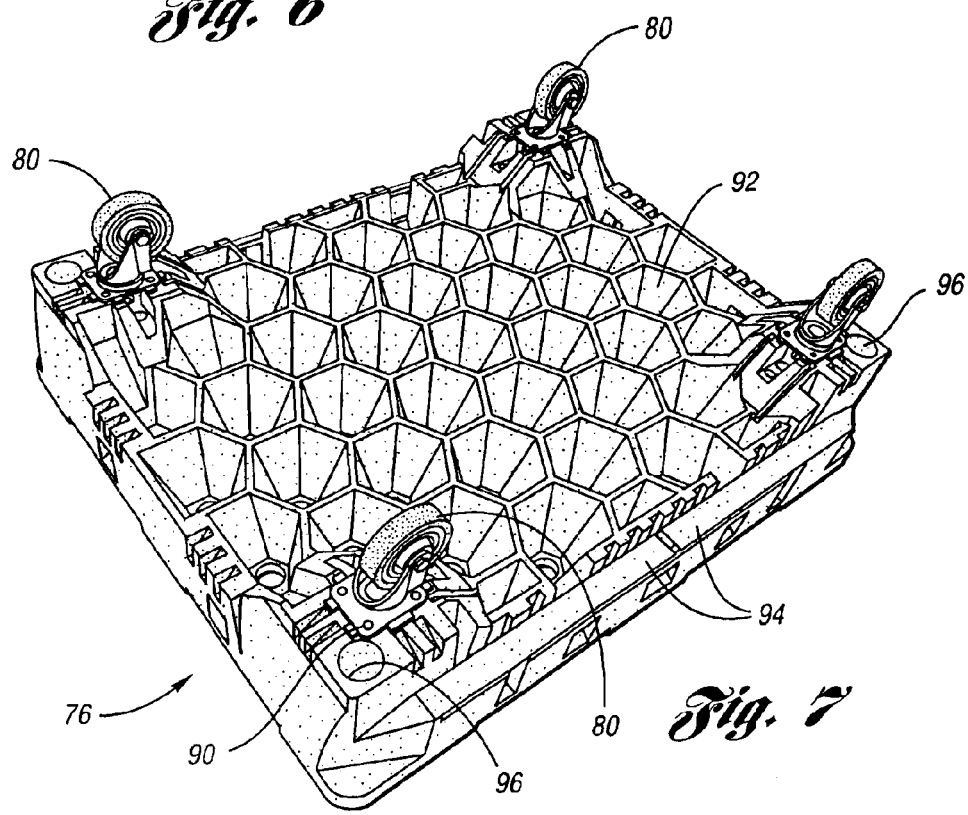
FIG. 7 is a bottom perspective view of the wheeled dolly shown in FIG. 5.

Referring now to FIGS. 5–7, the construction of the dolly 76 is described in greater detail. Each dolly 76 includes a platform 78 that is supported on a plurality of wheels 80. The platform 78 has wheel receptacle pockets 82 that receive wheels of another dolly 76 when one dolly 76 is stacked upon another. The upper surface of the platform 84 may be provided with holes 77 or other surface features that facilitate water drainage or positioning a load on the platform 78. Fastener holes 86 are provided in the wheel receptacle pockets 82. Drain holes 88 are also provided in the wheel receptacle pockets 82 so that any water may drain from the wheel receptacle pockets 82. Fasteners 90 are used to secure the wheels 80 to the platform 78 and are received in the fastener holes 86.

The platform 78 includes honeycomb walls 92, as shown in FIG. 7, that provide a lightweight but strong platform support structure. Inserts 94 are provided on at least two of the lower surfaces of the dolly 76. The inserts are positioned to ride on the roller guides 52 as the dolly 76 is moved into and out of the compartments 16, 18. The inserts 94 are preferably metal strips that resist wear. Also visible on the bottom of the platform 78 are a plurality of locating pockets 96 that are used to receive locating pins of various material handling apparatus used to tilt, lift, or otherwise support the dolly 76 at a production line station.

While the best mode for carrying out the invention has been described in detail, those familiar with the art to which this invention relates will recognize various alternative designs and embodiments for practicing the invention as defined by the following claims.

What is claimed is:

1. A component part container delivery rack system for use in manufacturing operations, comprising:
   a component part container;
   a dolly associated with and supporting the component part container, the dolly having a plurality of wheels for moveably supporting the dolly;
   a frame having a front end, a back end, and a center rail disposed between the front and back ends, the frame having at least two compartments that are open on at least one side that extend between the front and back ends, the frame being supported on a plurality of pivotal wheels;
   a plurality of rollers rotatably disposed on the front end, the back end, and the center rail, the plurality of rollers having at least one roller downwardly offset relative to the other rollers to lift the dolly as the dolly is inserted into one of the compartments;
   a locking mechanism adapted to lock the dolly into one of the compartments when the dolly is transported by the frame;
   wherein the dolly is configured to be removably received in one of the compartments such that as the plurality of wheels do not support the dolly when the dolly is received in the one of the compartments and the dolly is decoupled from the frame when removed from one of the compartments.

2. The system of claim 1 wherein the frame has an E-shaped base and defines two compartments.

3. The system of claim 1 wherein the locking mechanism includes a pivoting lever disposed adjacent the compartments that is pivoted between a locked position and an unlocked position.

4. The system of claim 3 wherein the locking mechanism further comprises an having a U-shaped actuator bar that shifts the pivoting lever to the locked position when the dolly is inserted into the compartment and pushed against the U-shaped actuator bar.

5. The system of claim 3 wherein a manual actuator is provided on the frame for shifting the locking mechanism between the locked and unlocked positions.

6. The system of claim 3 wherein the locking mechanism further comprises an elongate bar coupled to the pivoting lever and a link adapted to couple the U-shaped actuator bar to the elongate bar.

7. The system of claim 1 wherein a plurality of guide elements are provided on the frame for guiding movement of the dollies into and out of the compartments.

8. The system of claim 1 wherein the plurality of rollers have an axis of rotation extending in a direction from the front end to the back end and being secured to the frame.

9. The system of claim 1 wherein the dolly is formed of polymeric material and includes hard inserts that engage the plurality of rollers.

10. The system of claim 1 wherein the dolly includes a platform deck having a plurality of pockets, wherein each of the pockets is configured to receive one of the plurality of wheels of another dolly stacked on top of the dolly.

11. The system of claim 1 wherein the dolly has a platform deck comprising an upper surface that is supported by a honeycomb body.

12. A method of stocking a production line using a motorized truck having a towing adapter and a plurality of trailers having wheels that are provided with a towing hook and a hook receiver respectively on one of a front end or a back end, each trailer having two sides extending between the front and back ends, the trailers being accessible from at least one of the two sides to load a plurality of platforms having wheels onto the trailers for transporting a plurality of wheeled platforms on the trailers, the method comprising:
   loading a first set of wheeled platforms loaded with a plurality of parts onto the trailers from the side;
   actuating a locking mechanism by engaging at least one wheeled platform against a U-shaped member rotataby disposed on the frame, the locking mechanism being adapted to prevent transverse movement of the wheeled platform relative to the frame;
   transporting the trailers with the first set of wheeled platforms and parts carried thereby to the production line;
   unloading the first set of wheeled platforms one at a time from the side of the trailers; and
   loading a second set of empty wheeled platforms onto the side of the trailers one at a time to replace the first set of wheeled platforms.

13. The method of claim 12 wherein the towing hooks and hook receivers are not unhooked as the first and second sets of wheeled platforms are loaded and unloaded.

14. The method of claim 12 wherein the loading and unloading steps are performed by rolling the first and second sets of wheeled platforms onto and off of the trailers through an opening in the side of the trailers.

15. The method of claim 12 wherein during the step of transporting the wheeled platforms the wheels thereof are raised above the surface of the floor.

16. The method of claim 12 further comprising unlocking the wheeled platforms prior to the unloading step to permit the wheeled platforms to be transversely moved relative to the trailers during the unloading step.

17. The method of claim 12 further comprising lifting the wheeled platforms during the loading steps and lowering the wheeled platforms during the unloading step.

18. A production line part stocking trailer assembly, comprising:
   a rack supported on a first set of wheels, the rack having a towing adapter at one end for attachment to a tow motor truck or another rack, the rack having a side opening and supporting members on opposite edges of the side opening; and
   a dolly having a second set of wheels, the dolly being adapted to be inserted and removed through the side opening and selectively carried by the rack, the dolly being temporarily disposed on the supporting members when carried by the rack with the second set of wheels being spaced from the ground, wherein the rack and the dolly have a locking mechanism for selectively locking the rack and dolly together when the dolly is carried by the rack, the locking mechanism having a pivoting lever and a U-shaped actuator bar pivotally disposed on the rack and adapted to actuate the pivoting lever to partially span the side opening to lock the dolly into the rack.

19. The production line part stocking trailer assembly of claim 18 wherein the supporting members are a plurality of rollers disposed on each edge of the side opening that are engaged by cooperative portions of the dolly that ride upon the rollers as the dolly is inserted and removed through the side opening.

20. The production line part stocking trailer assembly of claim 18 wherein the rack has an E-shaped base having two side openings on one side and wherein the rack is adapted to carry two dollies.

* * * * *